Patented June 23, 1936

2,045,132

UNITED STATES PATENT OFFICE 2,045,132

BETAINES AND PROCESS FOR PREPARING THE SAME

André Girard and Georges Sandulesco, Paris, France, assignors to Les Laboratoires Francais de Chimiotherapia, Paris, France, a corporation of France No Drawing. Application March 27, 1934, Serial No. 717,593. In Germany March 28, 1933

7 Claims. (Cl. 260—25)

The object of the present invention is to provide a group of reagents capable of combining with aldehydes and ketones of any group whatever. The combinations thus obtained are soluble in water, insoluble in ether ($C_2H_5$—O—$C_2H_5$) or any organic non-hydroxylated solvent and are readily dissociated, thus permitting the quantitative regeneration of the dissolved aldehydes and ketones.

The reagents of this group are quaternary ammonium salts with an hydrazide group, whose general formula is the following:

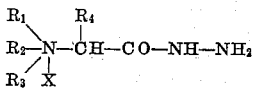

These bodies are obtained by causing hydrazine or its hydrate to react, when cold, on the esters of betaines or their salts.

The reaction, which is exothermic, starts immediately, alcohol being eliminated.

The radicals $R_1$, $R_2$, and $R_3$ may be any radicals depending on the bodies treated and can be replaced by closed chains and the radical $R_4$ is an alkyl group or can be replaced by hydrogen; X stands for an halogen.

It is preferable to work in absolute alcohol. It is not necessary to separate the betaine ester.

The latter is prepared in solution by the known process which consists in causing a molecule of a tertiary amine to react on a molecule of a halogenated ester. The hydrazin hydrate is then added to the resulting product.

We might operate through a reverse process, but in this case the yields would be smaller.

We might also, according to the present invention, cause the hydrazine to react on the anhydrides or the chlorides of the betaines, i. e. of acids having a quaternary ammonium or pyridinium group or make use of any other method of preparing hydrazides as can be applied to the particular instance.

By causing the hydrazides thus obtained to react on aldehydes or ketones, and especially on ketonic sexual hormones, we obtain water-soluble hydrazones, having no solubility in non-hydroxylated organic solvents.

These hydrazones are very unstable in an aqueous medium and they yield back the aldehydes and the ketones without alteration when treated according to known methods for the dissociation of hydrazones, and notably when treated by an excess of formaldehyde, in the presence of an inorganic strong acid.

We will now give two examples of the invention:

*Example I.*—Preparation of trimethylacethydrazide-ammonium chloride.

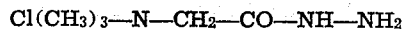

In a container of a volume of 5 liters, we pour 2 liters of absolute alcohol, 940 grams of pure ethyl chloroacetate, and then 250 grams of anhydrous trimethylamine which has been previously thoroughly cooled in a refrigerating mixture. The formation of ethyl ester of betaine starts immediately, and the temperature of the container quickly reaches 75° C. After complete cooling we again add 200 grams of trimethylamine. This addition is followed by a new heating. The mass is allowed to cool completely for twenty-four hours.

The ethyl ester of betaine, which is quantitatively formed in the course of this reaction, remains dissolved.

In the thoroughly cooled solution we add 380 grams of pure hydrazine hydrate at a time. A very strongly exothermic reaction is immediately started and after stirring, the reaction mixture is left alone. After a short time (several minutes) crystallization starts and finally the whole of the mass solidifies. After a period of twelve hours in a refrigerated medium, we dry the product and wash it with icy cold absolute alcohol. We obtain 1100 grams of the finished product. After evaporation, the mother liquors yield 70 grams of the product. The total amount thus obtained corresponds to 95% of the theoretical amount. Trimethylacethydrazide-ammonium chloride is a white solid body which is highly soluble in water, hygroscopic, very soluble in methanol, in crystallizable acetic acid and adapted to be dissolved in boiling absolute alcohol; it melts at 192° C. with decomposition.

*Example II.*—Preparation of acethydrazide-pyridinium chloride.

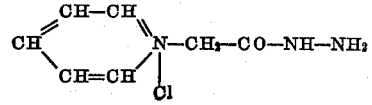

We cause the following mixture to boil for ten hours, with reflux:

| | |
|---|---|
| Anhydrous pyridine | 800 grams |
| Ethyl chloracetate | 1230 grams |
| Alcohol | 4 liters | until the reaction mixture has become entirely soluble in water and has lost its tear producing odor.

After cooling, we progressively add 500 grams of hydrazine hydrate dissolved in its volume of absolute alcohol.

A reaction is immediately started and the whole mass of the liquid solidifies. The acethydrazide-pyridinium chloride is freed from liquid, washed with absolute alcohol and then dried in the atmosphere. It is pure after a single recrystallization in alcohol of 96°.

The amount of final product that is obtained is 85% of the theoretical amount.

Acethydrazide-pyridinium chloride melts at 201–202° C. and crystallizes out of 90 per cent alcohol as white needles. It is less soluble than the product of Example 1 and is not hygroscopic.

What we claim is:

1. A method for the manufacture of water-soluble compounds adapted to form water-soluble, readily dissociatable combinations with carbonyl containing compounds, which comprises causing hydrazine to react on an halide of a body selected from the group consisting of ethyl ester of betaine and ethyl ester of pyridine betaine.

2. The manufacture of trimethylacethydrazide-ammonium chloride, which comprises causing ethyl chloracetate to react on anhydrous trimethylamine in absolute alcohol medium, thus forming chloride of betaine ethyl ester, and causing hydrazine hydrate to react with said chloride of betaine ethyl ether.

3. Water-soluble compounds adapted to form with carbonyl containing compounds, water-soluble hydrazones that can be readily dissociated by known hydrazone dissociating media, said water-soluble compounds being represented by general formula—

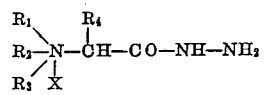

in which $R_1$, $R_2$, $R_3$ stand for alkyl groups, X stands for an halogen, $R_4$ is selected from the group consisting of alkyl groups and hydrogen.

4. The water-soluble compounds of claim 3, in which $R_1$, $R_2$, $R_3$ are connected into a closed chain forming a pyridine ring with the nitrogen.

5. As a new product, trimethylacethydrazide-ammonium chloride represented by formula—

$$Cl(CH_3)_3N-CH_2-CO-NH-NH_2$$

being a white, hygroscopic solid which is soluble in water, methanol, acetic acid and boiling absolute alcohol, which melts at 192° C. with decomposition.

6. As a new product, acethydrazide-pyridinium chloride represented by formula—

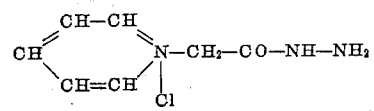

adapted to crystallize out of 90 per cent alcohol in white needles and melting at 201–202° C.

7. The manufacture of acethydrazide-pyridinium chloride, which comprises causing ethyl chloracetate to react on anhydrous pyridine in the presence of alcohol, thus forming chloride of pyridine betaine ethyl ester:

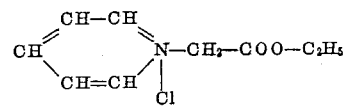

and causing hydrazine hydrate to react with said chloride of pyridine betaine ethyl ester.

ANDRÉ GIRARD.
GEORGES SANDULESCO.